Nov. 5, 1940.  A. E. HERBSTER ET AL  2,220,680
HEAD PULLER
Filed July 11, 1938
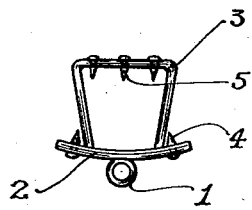
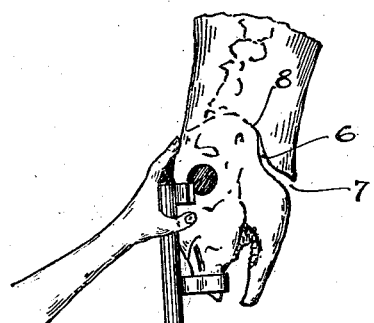
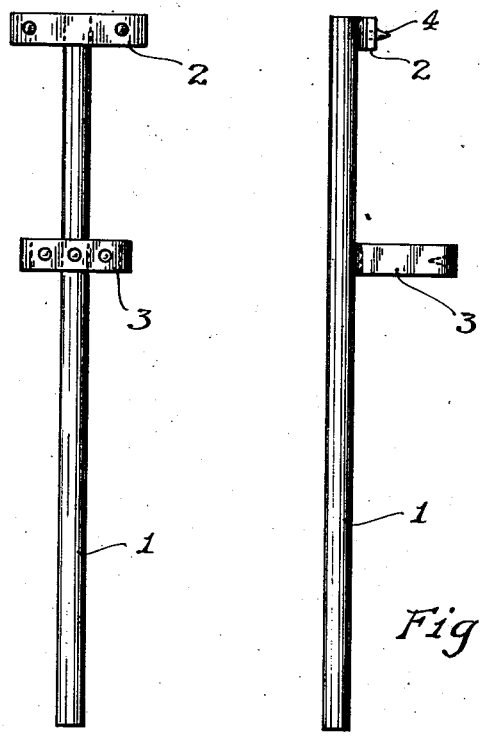
Arthur Edward Herbster
and Charles Otto Krokey
INVENTORS
ATTORNEY Patented Nov. 5, 1940

2,220,680

UNITED STATES PATENT OFFICE 2,220,680

HEAD PULLER

Arthur Edward Herbster and Charles Otto Krokey, Cleveland, Ohio

Application July 11, 1938, Serial No. 218,654

10 Claims. (Cl. 17—1)

This invention relates to means adaptable for use in the severing of heads from animal carcasses.

One of the objects of the invention is to provide means adaptable for use in the severing of heads from animal carcasses.

Other objects of the invention will be apparent from the description and claims which follow.

According to conventional practice the heads of animal carcasses are severed by encircling the neck adjacent the head with a knife-cut and thereafter twisting and breaking the head from the neck bone. The difficulty with this method is that most of the crown meat is left on the head and must be trimmed from the head. The crown meat trimmed from the head is classifiable only as trimmings and must be sold as such.

In accordance with the present invention the neck meat is severed between the ears and adjacent the lower jaw bone and the neck bone is broken by the application of relatively opposite pressures against one of the jaws and skull of the carcass head. Thereafter, the head is severed from the carcass by cutting the crown meat between the ears and adjacent the skull line. In the present invention the crown meat is retained as part of the higher grade carcass meat.

Broadly, the device of the present invention comprises a lever having means at one end thereof for engaging the top of the carcass head and means intermediate the ends thereof for engaging one of the jaws of the carcass mouth. More specifically, the means provided intermediate the ends of the lever constitutes a member having a part adapted to substantially encompass the upper jaw of the carcass mouth and to engage the said jaw immediately beneath the premaxillae.

The device of the present invention is illustrated more particularly in the drawing in which like characters of reference are used to designate similar elements.

Figure 1 is a side view of the device.

Figure 2 is another side view of the device shown in Figure 1.

Figure 3 is an end view of the device shown in Figure 1.

Figure 4 is a view showing the manner in which the device is employed.

The device comprises lever 1 provided at one end with cross member 2 and intermediate its ends with loop 3. Cross member 2 and loop 3 may be welded or otherwise rigidly secured to lever 1.

As shown in the drawing, cross member 2 and loop 3, respectively, may be provided with gripping prongs 4 and 5. The prongs 4 and 5 may be welded or otherwise rigidly secured through suitable openings provided in cross member 2 and loop 3.

According to the present invention, a cut 6 is made preferably from the stick hole, as at 7, to each of the ears 8. Thereafter, the neck bone is broken by the application by an operator of the lever 1 to the head of the carcass in a manner to apply relatively opposite pressures between one of the jaws and skull of the carcass head.

As shown in Figure 4, loop 3 is fitted around one of the jaws, preferably the upper jaw, in a manner to rest cross member 2 against the skull. Then the operator with one hand presses against the end of lever 1 rested against the skull and with the other hand gives a sharp upward pull against the opposite end of lever 1 thereby breaking the neck bone. Thereafter, the head is completely severed from the carcass by a knife cut made between the ears and against the skull line.

It will be seen, of course, that by use of a larger loop 3, the loop 3 may be fitted around the lower jaw in a manner to rest cross member 2 against the skull of the carcass head.

We claim:

1. A tool for severing carcass heads comprising a straight lever provided at one end with an arcuate fulcrum member adapted to fit against the top of the skull of the carcass head, and a load bearing member intermediate of the middle of said lever and said fulcrum member and adapted to encircle the upper jaw of the carcass head.

2. A tool for severing carcass heads comprising a straight lever provided at one end with an arcuate fulcrum member adapted to fit against the top of the skull of the carcass head, and a load bearing member intermediate of the middle of said lever and said fulcrum member and adapted to encircle the upper jaw of the carcass head, the said fulcrum member and the load bearing member being provided with gripping prongs.

3. A tool adaptable for use in severing the head of an animal carcass from the remainder of the carcass body comprising a lever having means at one end thereof for engaging the top of the carcass head and means intermediate the ends thereof adaptable to firmly engage one of the jaws of the carcass head.

4. A tool adaptable for use in severing the head of an animal carcass from the remainder of the carcass body comprising a lever having means at one end thereof for engaging the top of the carcass head and means intermediate the ends thereof adaptable to firmly engage one of the jaws of the carcass head, said first mentioned means constituting a fulcrum.

5. A tool adaptable for use in severing the head of an animal carcass from the remainder of the carcass body comprising a lever having means at one end thereof for engaging the top of the carcass head and means intermediate the ends thereof adaptable to firmly engage one of the jaws of the carcass head, said second mentioned means constituting a member adapted to substantially encompass the upper jaw of the carcass head.

6. A tool adaptable for use in severing the head of an animal carcass from the remainder of the carcass body comprising a lever having means at one end thereof for engaging the top of the carcass head and means intermediate the ends thereof adaptable to firmly engage one of the jaws of the carcass head, said first mentioned means constituting a fulcrum, said second mentioned means constituting a member adapted to substantially encompass the upper jaw of the carcass head, each of said means being provided with gripping prongs.

7. A tool adaptable for use in severing the head of an animal carcass from the remainder of the carcass body comprising a lever having means at one end thereof adapted to engage the top of the carcass head and means intermediate the ends thereof comprising a member having a part adapted to firmly engage the premaxillae.

8. A tool adaptable for use in severing the head of an animal carcass from the remainder of the carcass body comprising a lever having means at one end thereof adapted for engaging the top of the carcass head and means intermediate the ends thereof comprising a member adapted to substantially encompass the upper jaw of the carcass head immediately beneath the premaxillae.

9. A tool adaptable for use in severing the head of an animal carcass body comprising a lever, a cross member rigidly affixed to the lever at one end thereof and adapted to engage the top of the carcass head, and a loop member rigidly affixed to the lever intermediate the ends thereof and adapted to grip the upper jaw of the carcass head immediately beneath the premaxillae.

10. A tool adaptable for use in severing the head of an animal carcass body comprising a lever, a cross member rigidly affixed to the lever at one end thereof and adapted to engage the top of the carcass head, and a loop member rigidly affixed to the lever intermediate the ends thereof and adapted to grip the upper jaw of the carcass head and immediately beneath the premaxillae, the cross member and the loop member each being provided with gripping prongs.

ARTHUR EDWARD HERBSTER.
CHARLES OTTO KROKEY.